(12) United States Patent
Stewart et al.

(10) Patent No.: US 8,904,453 B2
(45) Date of Patent: Dec. 2, 2014

(54) SYSTEMS AND METHODS FOR SEAMLESSLY SWITCHING BETWEEN MEDIA STREAMS

(71) Applicant: Apple Inc., Cupertino, CA (US)

(72) Inventors: William G. Stewart, Los Altos, CA (US); Roger N. Pantos, Cupertino, CA (US); Douglas S. Wyatt, Portola Valley, CA (US); Zhenheng Li, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/828,332

(22) Filed: Mar. 14, 2013

(65) Prior Publication Data

US 2013/0332969 A1    Dec. 12, 2013

Related U.S. Application Data

(60) Provisional application No. 61/657,875, filed on Jun. 10, 2012.

(51) Int. Cl.

| | |
|---|---|
| *H04N 7/173* | (2011.01) |
| *H04N 7/10* | (2006.01) |
| *H04N 7/025* | (2006.01) |
| *H04N 21/43* | (2011.01) |
| *H04N 21/2343* | (2011.01) |
| *H04N 21/472* | (2011.01) |
| *H04N 21/442* | (2011.01) |
| *G11B 27/038* | (2006.01) |
| *H04N 21/439* | (2011.01) |
| *H04N 21/845* | (2011.01) |

(52) U.S. Cl.
CPC ..... *H04N 21/47202* (2013.01); *H04N 21/4307* (2013.01); *H04N 21/8456* (2013.01); *H04N 21/23439* (2013.01); *H04N 21/44209* (2013.01); *G11B 27/038* (2013.01); *H04N 21/439* (2013.01)

USPC .............................................. 725/87; 725/32

(58) Field of Classification Search
None
See application file for complete search history.

(56) References Cited

U.S. PATENT DOCUMENTS

| | | | |
|---|---|---|---|
| 6,292,454 B1 * | 9/2001 | Hu ........................... | 369/124.08 |
| 7,302,396 B1 | 11/2007 | Cooke | |
| 8,321,905 B1 | 11/2012 | Streeter et al. | |
| 2002/0191116 A1 * | 12/2002 | Kessler et al. ................ | 348/723 |
| 2009/0024234 A1 | 1/2009 | Archibald | |

(Continued)

OTHER PUBLICATIONS

Sridhar et al., "Multiplexing and Demultiplexing of AVS China Video with AAC Audio," 10th International Conference on Telecommunication in Modern Satellite Cable and Broadcasting Services (TELSIKS), IEEE, Oct. 5, 2011, pp. 84-91.

(Continued)

*Primary Examiner* — Nathan Flynn
*Assistant Examiner* — William J Kim
(74) *Attorney, Agent, or Firm* — Kenyon & Kenyon LLP

(57) ABSTRACT

Systems and methods for switching between encoded media streams are disclosed. A system may be configured to receive at least two media streams of differing qualities that are associated with an identical media asset. The system can seamlessly switch between a first media stream and a second media stream using an algorithm that can determine which frames of a second stream must be discarded to sync the second stream with the first media stream. The two media streams can then be cross faded to switch from the first media stream to the second media stream.

17 Claims, 6 Drawing Sheets

(56) References Cited

U.S. PATENT DOCUMENTS

| | | |
|---|---|---|
| 2009/0097595 A1* | 4/2009 | Ma .............................. 375/340 |
| 2009/0190034 A1 | 7/2009 | Kobayashi |
| 2009/0307368 A1 | 12/2009 | Sriram et al. |
| 2011/0150099 A1 | 6/2011 | Owen |
| 2012/0053710 A1 | 3/2012 | Lindahl et al. |

OTHER PUBLICATIONS

International Search Report, dated Aug. 6, 2013, from corresponding International Patent Application No. PCT/US2013/041582, filed May 17, 2013.

* cited by examiner

SYSTEMS AND METHODS FOR SEAMLESSLY SWITCHING BETWEEN MEDIA STREAMS

CROSS REFERENCE TO RELATED APPLICATIONS

This application claims the benefit of U.S. Provisional Patent Application No. 61/657,875, filed Jun. 10, 2012, which is hereby incorporated by reference herein in its entirety.

BACKGROUND OF THE DISCLOSURE

Digital content, such as video or audio, can be streamed from a source to a client. Such streaming is prevalent, for example, in video-on-demand ("VOD") services. A VOD server can store multiple versions of the same video (e.g., the server can store low and high resolution versions of the video). During playback, the client can begin playback of the low resolution version, and then, after determining whether various system requirements (e.g., bandwidth or hardware capabilities) are met, the client can switch playback from the low resolution to the high resolution version of the video.

However, when content is encoded using different sample or frame rates, the timepoints in each version are not readily identifiable, resulting in gaps or skips in the playback. Accordingly, what is needed are systems and methods for switching between multiple streams of encoded media.

SUMMARY OF THE DISCLOSURE

Systems and methods for seamlessly switching between multiple streams of encoded media during streaming playback are disclosed. For example, a client receiving streaming playback of media can seamlessly switch between streams of different quality (e.g., streams with different sampling rates) without any appreciable gaps, pauses, drop-offs, distortions, artifacts, or other abnormalities. The client can use a stream switching algorithm that, according to various embodiments, can determine which frames need to be discarded from one or more packets of a second stream (i.e., the stream being switched to) in order to synchronize the timepoint of the second stream with the timepoint of a first stream (i.e., the stream being switched from).

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for seamlessly switching between multiple streams of encoded media encoded during streaming playback are disclosed.

Figure 1:
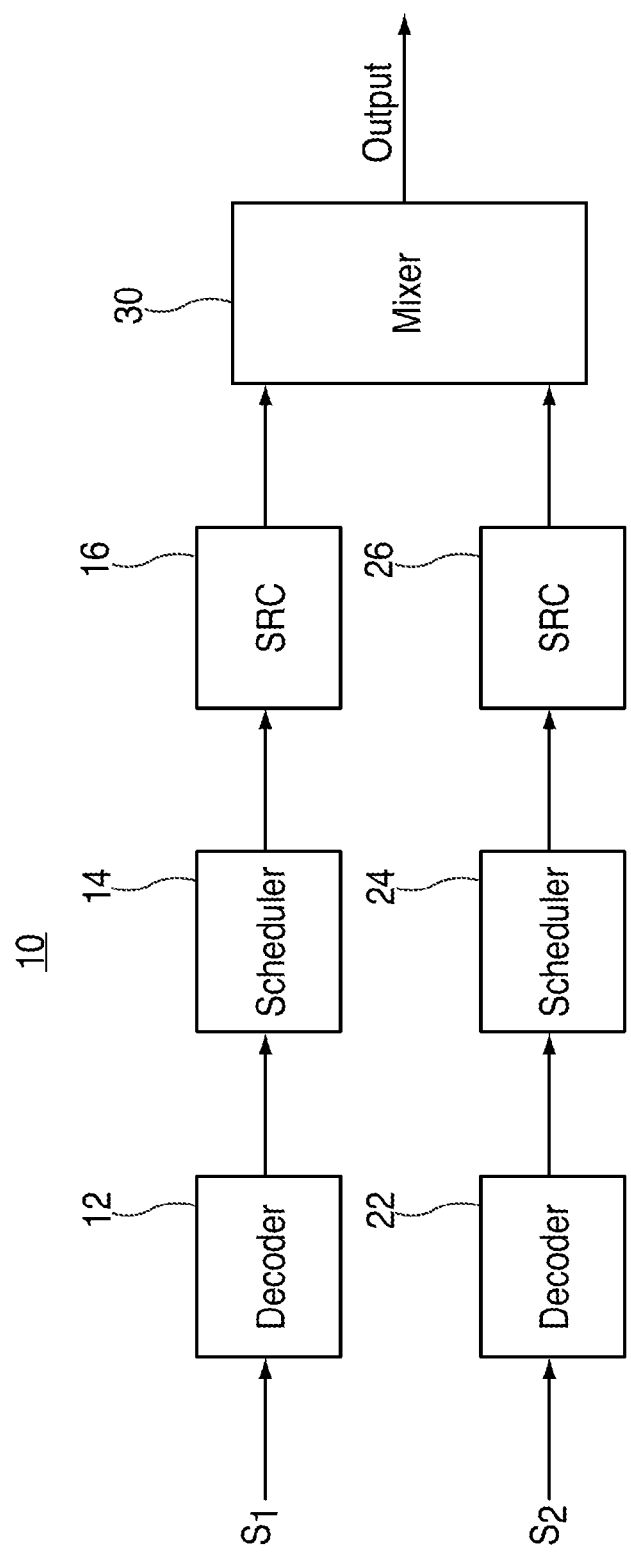
FIG. 1 shows illustrative block diagram of a stream switching system in accordance with some embodiments.

FIG. 1 shows illustrative block diagram of a stream switching system 10 in accordance with some embodiments. System 10 may be, or may be included within, any suitable electronic device capable of receiving multiple streams of the same media asset (e.g., electronic device 100 of FIG. 3). System 10 may be referred to as a client that receives streamed content from a server (not shown). The streamed content, identified as $S_1$ and $S_2$, can include encoded media. Accordingly, each packet can have a predetermined number of frames. In some embodiments, the media can be encoded using an inter-packet dependency scheme in which some frames can overlap between adjacent packets. Specific examples of inter-packet dependency schemes can include AAC. The media asset received by system 10 can be audio media, video media, or a combination of audio and video media. The media assets can be live or pre-recorded.

System 10 can include, among other unnamed components, decoders 12 and 22, schedulers 14 and 24, sample rate converters ("SRC") 16 and 26, and mixer 30. Content stream $S_1$ is shown being fed to decoder 12, and content stream $S_2$ is shown being fed to decoder 22. Only two streams (and corresponding decoder, scheduler, and SRC) are shown to avoid overcrowding the figure, but should be understood that any number of streams (and corresponding number of decoders, schedulers, and SRCs) may be implemented in system 10.

Decoder 12 can decode data packets received on $S_1$ and provide a decoded signal to scheduler 14. Decoder 12 can be a processing block that allows playback of an audio or video file encoded with in a recognized format such as AAC or HTTP Live Streaming (available from Apple Inc. of Cupertino, Calif.), for example. Scheduler 14 can handle timing processes associated with the decoded signal.

SRC 16 can convert the decoded signal into a signal suitable for playback. Specifically, SRC 16 can convert the sample rate of the decoded signal to the sample rate used by system 10. Sample rate converters may introduce hardware latency to the decoded signal. Latency can refer to the time required for an audio sample to proceed from an input to a corresponding output. Total latency of the system can include hardware latency, such as the latency introduced by SRC 16, safety offset latency, and buffer latency. In this case, the scheduling of a stream must be offset according to the total latency, and scheduler 14 can handle this offset. In some embodiments, such as when system 10 can playback the decoded signal at its native sample rate, SRC 16 is optional and total latency can be reduced.

Decoder 22, scheduler 24, and SRC 26 can be functionally identical to decoder, 12, scheduler 24, and SRC 26, respectively, with the difference being decoder decodes data received on $S_2$.

Mixer 30 can combine signals received from SRCs 16 and 26. In particular, mixer 30 can crossfade streams $S_1$ and $S_2$ over a period, n. Mixer 30 can crossfade the streams by ramping down $S_1$'s volume from 1.0 to 0.0 over the period of n seconds, where 1.0 represents maximum volume, and 0.0 represents zero volume. Simultaneously, mixer 30 can ramp up $S_2$'s volume from 0.0 to 1.0 over the same period of n seconds. In some embodiments, n can be on the order of 20 ms. Mixer 30 may be responsive to a determination made by a stream switching algorithm as to when to initiate a cross-fade. For example, when both streams have started, the cross-fade can be performed at any point such that it completes before the end of the decoded frames for $S_1$. According to various embodiments, cross-fading between $S_1$ and $S_2$ may utilize any suitable cross-fading function. For example, the volume of $S_1$ may be ramped down and the volume of $S_2$ may be ramped up according to linear, logarithmic, or exponential functions, or combinations thereof.

Figure 2:
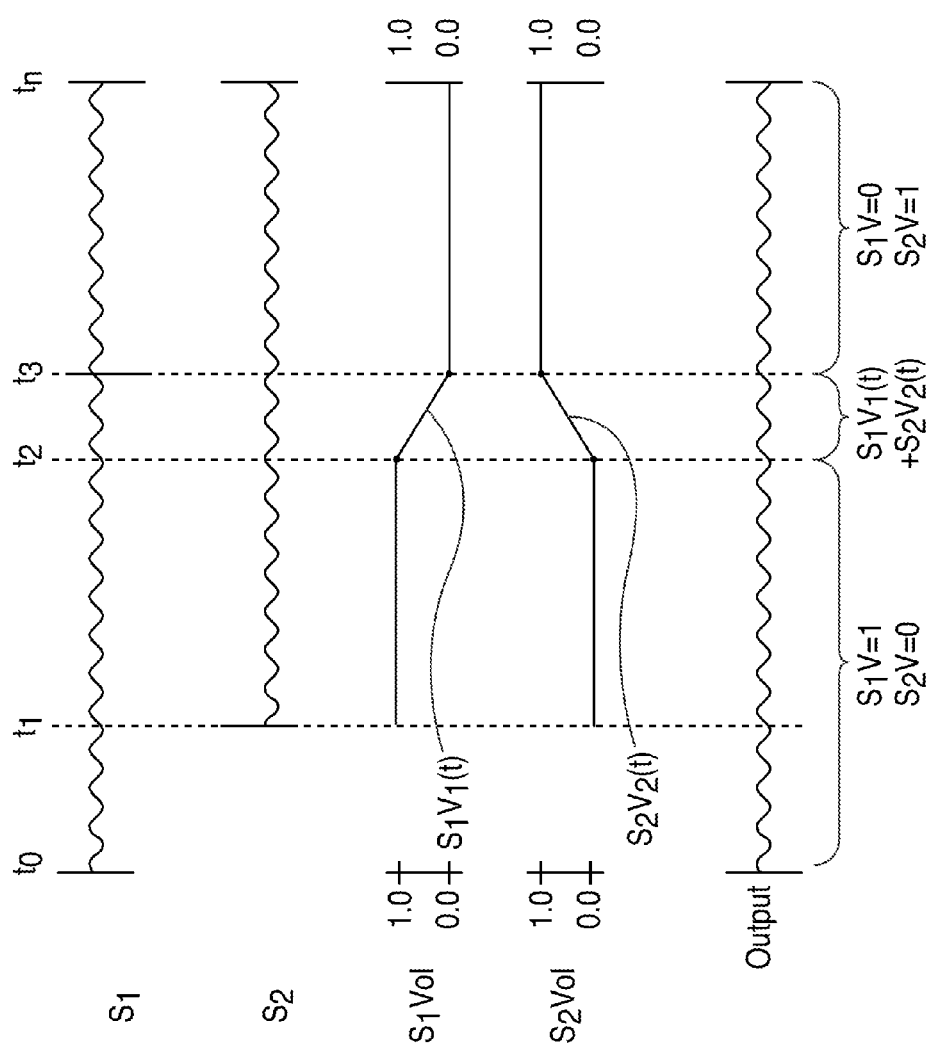
FIG. 2 shows an illustrative timing diagram of two input streams being processed by a stream switching algorithm in accordance with some embodiments.

Referring now to FIG. 2, an illustrative timing diagram showing how two input streams, $S_1$ and $S_2$, can be processed by a stream switching algorithm in accordance with some embodiments. $S_1$ can represent a first, currently playing stream of an entire media file (e.g., an audio file) having playback duration of $t_n$. $S_2$ can represent a second stream of the same media file, which can become the new currently playing stream after processing by the stream switching algorithm. In some embodiments, $S_1$ may be a low resolution encoding of the media file and $S_2$ can be a high resolution encoding of the same media file.

FIG. 2 also depicts waveforms $S_1$-Vol, $S_2$-Vol, and output. Waveforms $S_1$-Vol and $S_2$-Vol can graphically represent the extent to which streams $S_1$ and $S_2$ are contributing to the output in the period of time between $t_0$ and $t_n$. When a particular stream has a value of 1.0, it is fully contributing to the output, while when a stream has a value of 0.0, it is not contributing to the output at all. The output waveform represents the combined output of steams $S_1$ and $S_2$. In other words, the output waveform is representative of the signal that will ultimately be heard by a listener.

For purposes of illustration, assume system 10 begins playback of stream $S_1$. Playback can begin with the start of the audio file at time, $t_0$. The output from $t_0$ to $t_1$ consists solely data from stream $S_1$. At time $t_1$, system 10 can decide to switch from stream $S_1$ to stream $S_2$ (e.g., based on a determination that there is sufficient bandwidth to handle the higher resolution stream, $S_2$). At this point, system 10 can begin downloading stream $S_2$. Once stream $S_2$ begins downloading, system 10 can make a decision to switch between streams at a future time, $t_2$. During the period between $t_1$ and $t_2$ (e.g., period n of FIG. 1), the output can remain consisting solely of data from stream $S_1$, as shown in the output waveform, and in the $S_1$-Vol waveform. In other words, the volume product of $S_1V$ is one, and the volume product of $S_2V$ is zero.

In the period between $t_1$ and $t_2$, system 10 can begin processing streams $S_1$ and $S_2$ to determine which frames in $S_2$ should be discarded such that streams $S_1$ and $S_2$ are in sync when the switch from $S_1$ to $S_2$ occurs. The details of how this determination is made are described below with respect to FIGS. 3 and 4. Once the determined number of frames from $S_2$ is discarded, $S_1$ and $S_2$ can be combined and cross-faded (e.g., with mixer 30 of FIG. 1).

At time $t_2$, system 10 can begin transitioning from $S_1$ to $S_2$. The transition includes mixing together and simultaneously playing back both $S_1$ and $S_2$. In the period between $t_2$ and $t_3$, the volume of $S_1$ can be ramped down from 1.0 to 0.0 (as illustrated by $S_1V_1(t)$), and the volume of $S_2$ can be ramped up from 0.0 to 1.0 (as illustrated by $S_2V_2(t)$). The mixing of $S_1$ and $S_2$ at the same synchronized time points can blend together any differences in output due to being encoded at different sample rates. This output waveform is illustrated as $S_1V_1(t)+S_2V_2(t)$.

At time $t_3$, the transition from $S_1$ to $S_2$ can be complete. At this point in time, $S_1$Vol is 0, and $S_2V$ is 1. System 10 can continue to playback $S_2$ until the end of the audio file at time $t_n$. In some embodiments, system 10 can continue to play $S_1$ at 0.0 volume alongside $S_2$ in order to ease the transition back to $S_1$, if necessary.

Figure 3:
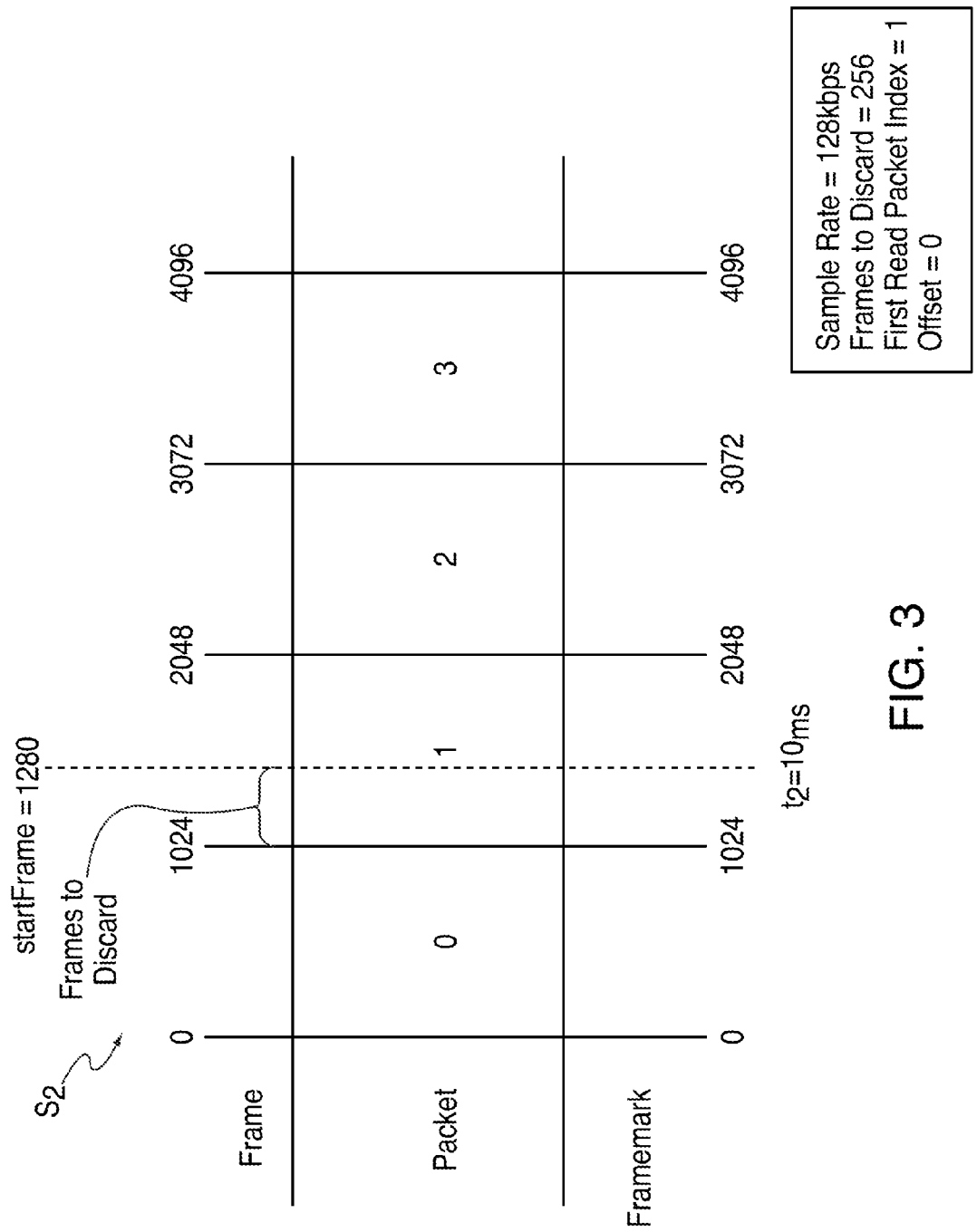
FIG. 3 shows an illustrative diagram for determining the number of frames of an input stream to discard in accordance with some embodiments.

FIG. 3 shows an illustrative diagram 300 for determining the number of frames to discard from a second input stream in accordance with some embodiments. Because the second input stream may have a different sample rate than the first input stream, the frames and packets of the two streams may not correspond directly to one another. Thus, to sync the two streams, frames may need to be discarded from the second stream to temporally match it with the first input stream. The second input stream (e.g., $S_2$ of FIG. 2) may be, for example, a higher resolution version of a first, currently playing, input stream (e.g., $S_1$ of FIG. 2). As noted above, the first and second input streams may be inter-packet dependent streams.

The second input stream, $S_2$, depicted in diagram 300 can be divided into a number of packets depending on the sample rate, the number of frames per packet, and the total length of the input stream according to the following equation:

$$\#packets = length * (sample\ rate/framesPerPacket) \qquad (1)$$

In the audio context, a "frame" can refer to a set of samples that contains one sample from each channel in an audio data stream. The samples in a frame are typically time-coincident. As one particular example, and as depicted in diagram 300, each packet can include 1,024 frames. Therefore, if $S_2$ is sampled at 128 kbps and the input stream is 1 s long, the input stream would include 125 packets. For clarity, only the first four packets [0-3] of the second input stream are depicted in diagram 300.

As the first input stream, $S_1$, is playing on system 10, $S_2$ can be analyzed to determine which packet of $S_2$ should be provided to the decoder and how many frames of $S_2$ that are provided to the decoder should be discarded. Starting from the beginning of packet 0 of $S_2$, an frame count can begin to increase from frame 0. Accordingly, packet 0 can start at frame 0, packet 1 can start at frame 1024, packet 2 can start at frame 2048, packet 3 can start at frame 3072, and so on.

As described above with respect to FIG. 2, system 10 can make a decision to switch between the first input stream ($S_1$) and $S_2$ at a future time, $t_2$. The startFrame (i.e., the frame of $S_2$ corresponding to $t_2$) may be determined as follows:

$$startFrame = t_2 * sample\ rate. \qquad (2)$$

In the embodiment depicted in diagram 300, $t_2$ has been chosen as 10 ms, which, assuming a 128 kbps sample rate, corresponds with startFrame 1280.

Once the startFrame is determined, the first packet of $S_2$ to provide to the decoder can be determined as follows:

$$firstReadPacketIndex = int(startFrame/framesPerPacket) \qquad (3)$$

where the firstReadPacketIndex is a zero-based index (i.e., the first packet of $S_2$ is packet 0). Thus, for the example shown in diagram 300, firstReadPacketIndex=int(1280/1024)=1. Therefore, the first packet to be provided to the decoder is packet 1. The framemark (i.e., the frame number corresponding to the beginning of the firstReadPacketIndex) can then be calculated as follows:

$$framemark = firstReadPacketIndex * framesPerPacket. \qquad (4)$$

In this example, framemark=1*1024=1024. Finally, the number of frames to discard may be calculated as follows:

$$framesToDiscard = startFrame - framemark. \qquad (5)$$

Accordingly, in the example depicted in diagram 300, frame 1 will be the first frame provided to the decoder, and 256 frames will be discarded in order to sync $S_2$ with $S_1$.

According to some embodiments, additional packets may be tacked onto the beginning of the portion of $S_2$ provided to the decoder. These packets can represent priming frames, which may be required to support format conversion, sample rate conversion, or to resolve inter-packet dependencies. If priming frames are required but are not provided, silent priming frames may be substituted. Any priming frames provided to the decoder can be discarded in addition to the discarded frames calculated above.

According to further embodiments, additional frames may be tacked onto the end of the portion of $S_2$ provided to the decoder. These packets can represent trailing frames. Trailing frames may be necessary to fill a partially filled packet at the end of $S_2$. Silent frames may be used as trailing frames for this purpose.

Figure 4:
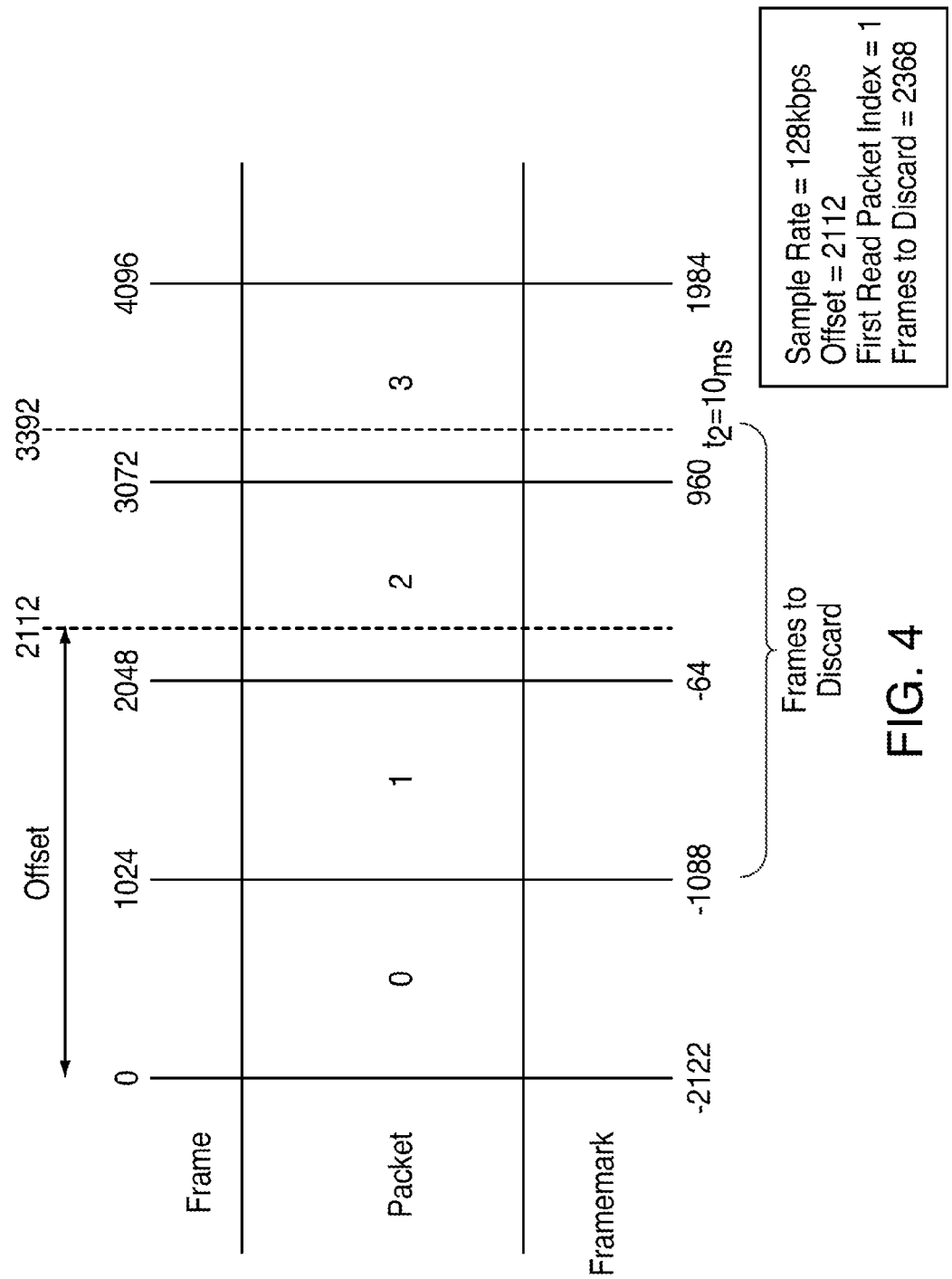
FIG. 4 shows another illustrative diagram for determining the number of frames of an input stream to discard in accordance with some embodiments.

FIG. 4 shows an illustrative diagram 400 for determining the number of frames to discard from a second input stream in accordance with some embodiments. In particular, diagram 400 can depict a system identical to the one shown in FIG. 3 with the exception that the second input stream, $S_2$, has been or will be delayed with respect to an first input stream, $S_1$.

As described above with respect to FIG. 2, system 10 can make a decision to switch between $S_1$ and $S_2$ at a future time, $t_2$. In embodiments in which $S_1$ and/or $S_2$ are exposed to a process that adds latency, a suitable number of packets can be provided to the decoder to ensure that the latency does not prevent syncing of the two input streams. In such embodiments the startFrame (i.e., the frame corresponding to $t_2$) may be determined with Eq. (2), above. In the embodiment depicted in diagram 400, $t_2$ has been chosen as 10 ms, which assuming a 128 kbps sample rate, corresponds with startFrame 1280.

Once the startFrame is determined, the first packet of S2 to provide to the decoder can be determined according to Eq. (3) above. Thus, for the example shown in diagram 400, firstReadPacketIndex=int(1280/1024)=1. Therefore, the first packet to be provided to the decoder is packet 1. The framemark (i.e., the frame number corresponding to the beginning of the firstReadPacketIndex) can then be calculated as follows:

$$\text{framemark} = \text{firstReadPacketIndex} * \text{framesPerPacket} - \text{offset}. \quad (6)$$

The offset may be the result of latency introduced by a SRC in the system (e.g., SRC 16 of FIG. 1), for example, in this example, framemark=1*1024−2122=−1088.

Finally, the number of frames to discard may be calculated according to Eq. (5) above. In the example depicted in diagram 400, framesToDiscard=startFrame−framemark=1280−(−1088)=2368. Accordingly, frame 1 will be the first frame provided to the decoder, and 2116 frames will be discarded in order to sync $S_2$ with $S_1$.

Figure 5:
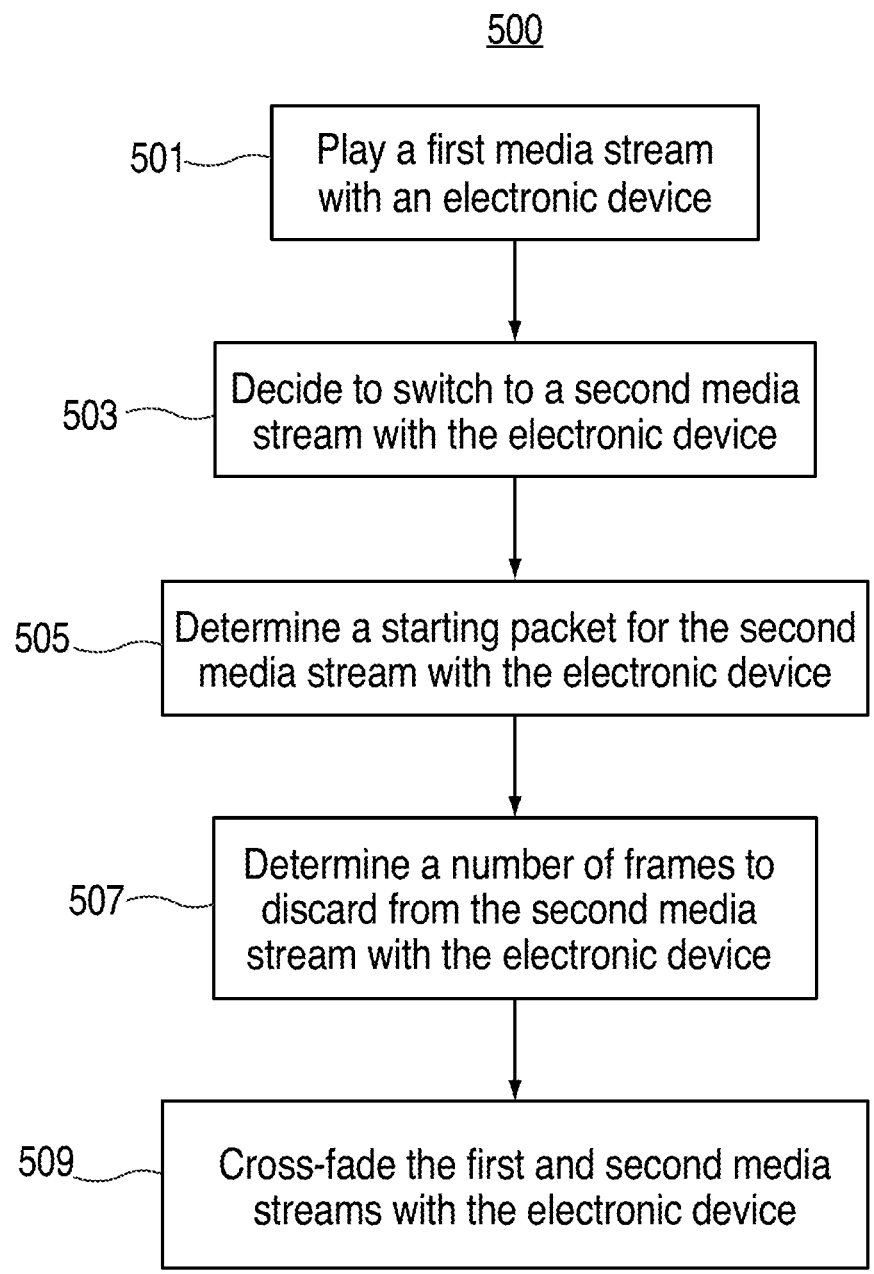
FIG. 5 shows an illustrative process for switching between inter-packet dependent media streams in accordance with some embodiments.

FIG. 5 is an illustrative flowchart of a process 500 for switching between encoded media streams in accordance with some embodiments. At step 501, a first media stream can be played by an electronic device (e.g., electronic device 600 described below with respect to FIG. 6). The first inter-packet dependent media stream may be live or pre-recorded audio media, video media, or a combination of audio and video media. Further, the first media stream can be played on its own and at full strength such that an output signal generated by the electronic device consists solely of the first inter-packet dependent media stream.

At step 503, the electronic device can decide to switch to a second media stream. The second media stream may be a higher resolution version of the first media stream, for example. If the second media stream is a higher resolution version, the decision to switch may be based upon a determination that the electronic device has sufficient bandwidth to handle the higher resolution media stream. On the other hand, if the second media stream is a lower resolution version, the decision to switch may be based upon a determination that the electronic device lacks sufficient bandwidth to handle the first inter-packet dependent media stream.

At step 505, an appropriate starting packet for a second media stream can be determined. As described above with respect to FIGS. 3 and 4, the electronic device may determine the appropriate starting packet based upon a future time set for cross-fading the first and second media streams. According to some embodiments, the packet may be chosen to minimize the number of frames that will need to be discarded in order to sync the two media streams. In further embodiments, the packet may be chosen to account for latency that will be introduced during the processing of the second inter-packet dependent media stream. In still further embodiments, the packet may be chosen to provide priming frames to support format conversion, sample rate conversion, or inter-packet dependent media streams.

At step 507, an appropriate number of frames to discard from the second media stream can be determined with the electronic device. The appropriate number of frames may be the number of frames, taking into account any latency driven offset, required to be discarded to sync the first and second inter-packet dependent media streams. That is, the number of frames may be determined in order to temporally sync the two media streams together regardless of their respective sample rates.

At step 509, the first and second media streams can be cross-faded with the electronic device. Cross-fading the two media streams can entail simultaneously playing the two media streams while adjusting their respective volumes over a predetermined period of time. In particular, a mixer (e.g., mixer 30 of FIG. 1) can crossfade the two media streams by ramping down the volume of the first inter-packet dependent media stream from 1.0 to 0.0 over the period of n seconds, where 1.0 represents maximum volume, and 0.0 represents zero volume. Simultaneously, the mixer can ramp up the volume of the second inter-packet dependent media stream from 0.0 to 1.0 over the same period of n seconds. Any suitable ramping functions (e.g., linear, logarithmic, parabolic, and/or exponential functions) may be used for this purpose.

Figure 6:
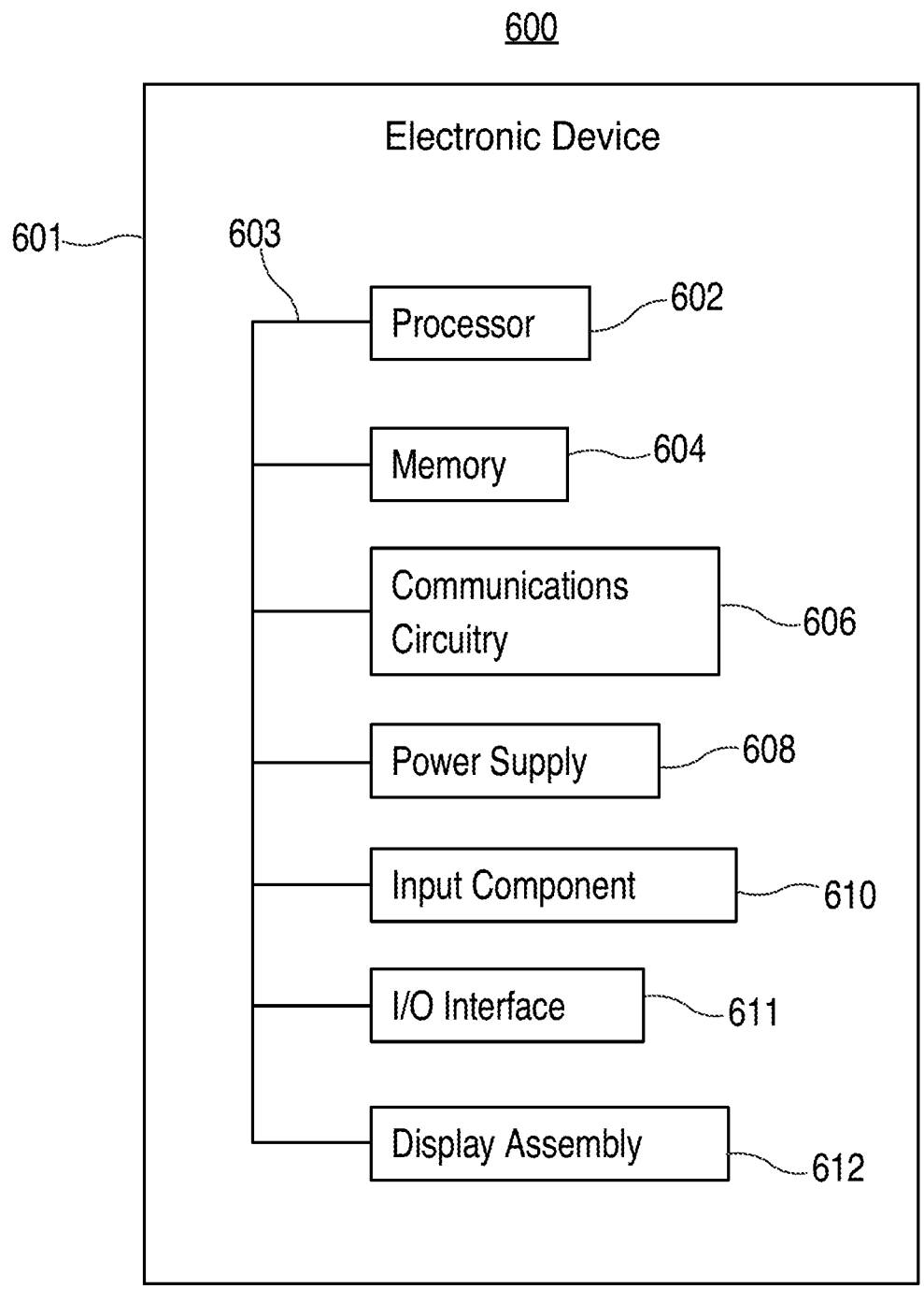
FIG. 6 shows an illustrative block diagram of an electronic device in accordance with some embodiments.

FIG. 6 is a schematic view of an illustrative electronic device in accordance with an embodiment. Electronic device 600 may be any portable, mobile, or hand-held electronic device configured to present visible information on a display assembly wherever the user travels. Alternatively, electronic device 600 may not be portable at all, but may instead be generally stationary. Electronic device 600 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., desktop, laptop, tablet, server, etc.), monitor, television, stereo equipment, set up box, set-top box, boom box, modem, router, keyboard, mouse, speaker, printer, and combinations thereof. In some embodiments, electronic device 600 may perform a single function (e.g., a device dedicated to displaying image content) and, in other embodiments, electronic device 600 may perform multiple functions (e.g., a device that displays image content, plays music, and receives and transmits telephone calls).

Electronic device 600 may include a housing 601, a processor or control circuitry 602, memory 604, communications circuitry 606, power supply 608, input component 610, display assembly 612, microphones 614, and microphone condition detection module 616. Electronic device 600 may also include a bus 603 that may provide a data transfer path for transferring data and/or power, to, from, or between various other components of device 600. In some embodiments, one or more components of electronic device 600 may be combined or omitted. Moreover, electronic device 600 may include other components not combined or included in FIG. 6. For the sake of simplicity, only one of each of the components is shown in FIG. 6.

Memory 604 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 604 may include cache memory, which may be one or more different types of memory used for temporarily storing data for electronic device applications. Memory 604 may store media data (e.g., music, image, and video files), software (e.g., for implementing functions on device 600), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 600 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 606 may be provided to allow device 600 to communicate with one or more other electronic devices or servers using any suitable communications protocol. For example, communications circuitry 606 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 906 may also include circuitry that can enable device 900 to be electrically coupled to another device (e.g., a computer or an accessory device) and communicate with that other device, either wirelessly or via a wired connection.

Power supply 608 may provide power to one or more of the components of device 600. In some embodiments, power supply 608 can be coupled to a power grid (e.g., when device 600 is not a portable device, such as a desktop computer). In some embodiments, power supply 608 can include one or more batteries for providing power (e.g., when device 600 is a portable device, such as a cellular telephone). As another example, power supply 608 can be configured to generate power from a natural source (e.g., solar power using one or more solar cells).

One or more input components 610 may be provided to permit a user to interact or interface with device 600. For example, input component 610 can take a variety of forms, including, but not limited to, a track pad, dial, click wheel, scroll wheel, touch screen, one or more buttons (e.g., a keyboard), mouse, joy stick, track ball, and combinations thereof. For example, input component 610 may include a multi-touch screen. Each input component 610 can be configured to provide one or more dedicated control functions for making selections or issuing commands associated with operating device 600.

Electronic device 600 may also include one or more output components that may present information (e.g., textual, graphical, audible, and/or tactile information) to a user of device 600. An output component of electronic device 600 may take various forms, including, but not limited, to audio speakers, headphones, audio line-outs, visual displays, antennas, infrared ports, rumblers, vibrators, or combinations thereof.

For example, electronic device 600 may include display assembly 612 as an output component. Display 612 may include any suitable type of display or interface for presenting visible information to a user of device 600. In some embodiments, display 612 may include a display embedded in device 600 or coupled to device 600 (e.g., a removable display). Display 612 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 612 can include a movable display or a projecting system for providing a display of content on a surface remote from electronic device 600, such as, for example, a video projector, a head-up display, or a three-dimensional (e.g., holographic) display. As another example, display 612 may include a digital or mechanical viewfinder. In some embodiments, display 612 may include a viewfinder of the type found in compact digital cameras, reflex cameras, or any other suitable still or video camera.

It should be noted that one or more input components and one or more output components may sometimes be referred to collectively as an I/O interface (e.g., input component 610 and display 612 as I/O interface 611). It should also be noted that input component 610 and display 612 may sometimes be a single I/O component, such as a touch screen that may receive input information through a user's touch of a display screen and that may also provide visual information to a user via that same display screen.

Processor 602 of device 600 may control the operation of many functions and other circuitry provided by device 600. For example, processor 602 may receive input signals from input component 610 and/or drive output signals to display assembly 612. Processor 602 may load a user interface program (e.g., a program stored in memory 604 or another device or server) to determine how instructions or data received via an input component 610 may manipulate the way in which information is provided to the user via an output component (e.g., display 612). For example, processor 602 may control the viewing angle of the visible information presented to the user by display 612 or may otherwise instruct display 612 to alter the viewing angle.

Electronic device 600 may also be provided with a housing 601 that may at least partially enclose one or more of the components of device 600 for protecting them from debris and other degrading forces external to device 600. In some embodiments, one or more of the components may be provided within its own housing (e.g., input component 610 may be an independent keyboard or mouse within its own housing that may wirelessly or through a wire communicate with processor 602, which may be provided within its own housing).

The described embodiments of the invention are presented for the purpose of illustration and not of limitation.

What is claimed is:

1. A system for switching between media streams, the system comprising:
    a first decoder configured to decode a first input stream;
    a second decoder configured to decode a second input stream;
    a processor configured to determine a first packet of the second input stream to provide to the second decoder based upon at least a start frame associated with a start time for beginning to cross-fade from the first input stream to the second input stream and a number of frames per packet of the second input stream, and further configured to determine a number of frames to discard from the second input stream in order to temporally sync the second input stream with the first input stream, wherein the frames to be discarded from the second input stream overlaps in time with a portion of the first input stream; and
    a mixer configured to cross-fade from the first input stream to the second input stream.

2. The system of claim 1, wherein the number of frames to discard is determined based upon at least an index number of a first frame of the second input stream, a sample rate of the second input stream, and a start time for beginning to cross-fade from the first input stream to the second input stream.

3. The system of claim 1, further comprising a scheduler configured to implement an offset for playing back for second input stream based at least upon an expected latency value associated with the second input stream.

4. The system of claim 1, further comprising a sample rate converter ("SRC") for converting a first sample rate of at least one of the first input stream and the second input stream to a second sample rate.

5. The system of claim 4, the second sample rate corresponding to at least one of:
    a sample rate of the first input stream if the first sample rate corresponds to the second input stream;
    a sample rate of the second input stream if the first sample rate corresponds to the first input stream; and
    a sample rate native sample rate of the system.

6. A method for switching between media streams, the method comprising:
    playing a first media stream with an electronic device;
    deciding to switch to a second media stream with the electronic device;
    determining a starting packet for the second media stream with the electronic device based upon at least a start frame associated with a start time for beginning to cross-fade from the first input stream to the second input stream and a number of frames per packet of the second input stream;
    determining a number of frames to discard from the second media stream with the electronic device, wherein the frames to be discarded from the second media stream overlaps in time with a portion of the first media stream; and
    cross-fading the first and second media streams with the electronic device.

7. The method of claim 6, wherein deciding to switch to the second media stream comprises determining that the electronic device has sufficient bandwidth to stream the second media stream.

8. The method of claim 6, wherein determining the starting packet for the second media stream comprises:
    determining a start frame by multiplying a sample rate of the second media stream by a predetermined start time for cross-fading the first and second media streams;
    dividing the start frame by a number of frames per packet of the second media stream; and
    rounding a result of the dividing to a nearest integer that is less than the result.

9. The method of claim 8, wherein determining a number of frames to discard comprises:
    determining a framemark comprising multiplying an index number associated with the start frame by a number of frames per packet of the second media stream; and
    subtracting the framemark from the start frame.

10. The method of claim 8, wherein determining a number of frames to discard comprises:
    determining a framemark by multiplying an index number associated with the start frame by a number of frames per packet of the second media stream and subtracting an offset determined by a scheduler of the electronic device; and
    subtracting the framemark from the start frame.

11. The method of claim 10, wherein the offset compensates for a latency introduced into the second inter-packet dependent media stream.

12. The method of claim 6, wherein the cross-fading comprises:
    simultaneously playing the first and second media streams;
    ramping down a volume of the first media stream over a finite period; and
    ramping up a volume of the second media stream over the finite period.

13. An electronic device comprising a processor configured to:
    play a first media stream;
    decide to switch to a second media stream at future time, wherein the first and second media streams comprise identical media assets encoded at different resolutions;
    determine a starting packet for the second media stream based upon at least a start frame associated with a start time for beginning to cross-fade from the first input stream to the second input stream and a number of frames per packet of the second input stream;
    determine a number of frames to discard from the second media stream, wherein the frames to be discarded from the second media stream overlaps in time with a portion of the first media stream; and
    switch seamlessly from the first media stream to the second media stream.

14. The electronic device of claim 13, wherein the processor is configured to determine the starting packet as a result of:
    determining a start frame by multiplying a sample rate of the second media stream by a predetermined start time for cross-fading the first and second media streams;
    dividing the start frame by is number of frames per packet of the second media stream; and
    rounding a result of the dividing to a nearest integer that is less than the result.

15. The electronic device of claim 14, wherein the processor is configured to determine a number of frames to discard as a result of:

determining a framemark comprising multiplying an index number associated with the start frame by a number of frames per packet of the second media stream; and subtracting the framemark from the start frame.

16. The electronic device of claim 14, wherein the processor is configured to determine a number of frames to discard as a result of:

determining a framemark comprising multiplying an index number associated with the start frame by a number of frames per packet of the second media stream and subtracting an offset; and subtracting the framemark from the start frame.

17. The electronic device of claim 13, further comprising a mixer that cross fades the first media stream with the second media stream to switch seamlessly from the first media stream to the second media stream.

* * * * *